United States Patent
Carey et al.

(10) Patent No.: US 6,671,139 B2
(45) Date of Patent: Dec. 30, 2003

(54) IN-STACK LONGITUDINAL BIAS STRUCTURE FOR CIP SPIN VALVE SENSORS WITH BIAS LAYER ELECTRICALLY INSULATED FROM FREE LAYER

(75) Inventors: Kashmira J. Carey, San Jose, CA (US); Jeffrey R. Childress, San Jose, CA (US); Robert E. Fontana, Jr., San Jose, CA (US); Kuok San Ho, Cupertino, CA (US); Ching Hwa Tsang, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 10/066,067

(22) Filed: Jan. 31, 2002

(65) Prior Publication Data

US 2003/0206382 A1 Nov. 6, 2003

(51) Int. Cl.$^7$ .............................. G11B 5/127; G11B 5/39
(52) U.S. Cl. ................................................. 360/324.12
(58) Field of Search ........................ 360/324.12, 324.1, 360/324, 313, 110, 327.3, 327.32

(56) References Cited

U.S. PATENT DOCUMENTS

| | | | |
|---|---|---|---|
| 5,949,623 A | * 9/1999 | Lin | 360/324.12 |
| 6,023,395 A | 2/2000 | Dill et al. | 360/324.2 |
| 6,185,078 B1 | 2/2001 | Lin et al. | 360/324.12 |
| 2002/0163767 A1 | * 11/2002 | Terunuma | 360/324.12 |
| 2003/0035253 A1 | * 2/2003 | Lin et al. | 360/324 |

OTHER PUBLICATIONS

"Edge Bias of Magnetoresistive Films", Sep. 1, 1975, IBM TDB vol. 18, No. 4, pp. 1287–1288.*

* cited by examiner

Primary Examiner—Julie Anne Watko
(74) Attorney, Agent, or Firm—Lumen Intellectual Property Services, Inc.

(57) ABSTRACT

A magnetization of a ferromagnetic free layer of a current-in-plane (CIP) sensor is stabilized using an in-stack longitudinal bias structure that includes a ferromagnetic bias layer and an anti-ferromagnetic bias layer. An electrically insulating layer separates the ferromagnetic free layer and the in-stack longitudinal bias structure, and thus the leads attached to the CIP sensor do not make direct electrical contact with the in-stack longitudinal bias structure. As a result, the sense current shunted by the in-stack longitudinal bias structure is prevented. Since a width along the off track direction of the in-stack longitudinal bias structure is greater than the track-width of the CIP sensor, the edge magnetostatic coupling filed acting on the ferromagnetic free layer from the track width edges of the in-stack longitudinal bias structure is reduced to approximately zero.

18 Claims, 15 Drawing Sheets

IN-STACK LONGITUDINAL BIAS STRUCTURE FOR CIP SPIN VALVE SENSORS WITH BIAS LAYER ELECTRICALLY INSULATED FROM FREE LAYER

FIELD OF THE INVENTION

This invention relates generally to magnetoresistive read heads. More particularly, it relates to magnetoresistive read heads having in-stack longitudinal bias structures.

BACKGROUND ART

Thin film magnetoresistive (MR) sensors or heads have been used in magnetic data storage devices for several years. Physically distinct forms of magnetoresistance such as anisotropic magnetoresistance (AMR), giant magnetoresistance (GMR) and spin tunneling magnetoresistance (TMR) are well known in the art. Magnetic readback sensor designs have been built using these principles and other effects to produce devices capable of reading high density data. In particular, three general types of magnetic read heads or magnetic readback sensors have been developed: the anisotropic magnetoresistive (AMR) sensor, the giant magnetoresistive (GMR) sensor or GMR spin valve, and the magnetic tunnel junction (MTJ) sensor.

A magnetoresistive (MR) read head typically includes a top and bottom shield layers, top and bottom gap layers, a read sensor, such as a spin valve, and the first and second leads that are connected to the read sensor for conducting a sense current through the read sensor. The top and bottom gap layers are located between the top and bottom shield layers, and the read sensor and the first and second leads are located between the top and bottom gap layers. Accordingly, the top and bottom gap layers are constructed as thin as possible without shorting the top and bottom shield layers to the read sensor and the first and second leads.

The first and second leads abut the first and second side edges of the read sensor in a connection referred to in the art as a contiguous junction. A spin valve read sensor typically includes a spacer layer sandwiched between a free layer and a pinned layer, and a pinning layer adjacent to the pinned layer for pinning the magnetic moment of the pinned layer. The free layer has a magnetic moment that is free to rotate relative to the fixed magnetic moment of the pinned layer in the presence of an applied magnetic field.

Typically, magnetic spins of the free layer are unstable in small sensor geometries and produce magnetic noise in response to magnetic fields. Therefore, the free layer must be stabilized by longitudinal biasing so that the magnetic spins of the free layer are in a single domain configuration.

There are two stabilization schemes for longitudinal biasing of the free layer. One stabilization scheme is to provide a longitudinal bias field from the lead regions at the side edges of the read sensor. The most common technique of the prior art includes the fabrication of tail stabilization at the physical track edges of the sensor. The efficacy of the method of stabilization depends critically on the precise details of the tail stabilization, which is difficult to accurately control using present fabrication methods.

The other stabilization scheme is to provide an in-stack longitudinal bias structure including a soft ferromagnetic bias layer and an anti-ferromagnetic (AFM) bias layer. FIG. 1 shows an in-stack bias scheme for stabilizing a spin valve of the prior art. A MR sensing head 100 includes a spin valve 102 and an in-stack longitudinal bias structure 104. The spin valve 102 includes a free layer 112, a pinned layer 108, a spacer layer 110 located between the free layer 112 and the pinned layer 108, and an AFM layer 106 adjacent to the pinned layer 108. The in-stack longitudinal bias structure 104 includes a ferromagnetic bias layer 116 and an AFM bias layer 118. The MR sensing head also includes a non-magnetic spacer layer 114 disposed between the spin valve 102 and the in-stack longitudinal bias structure 104. The ferromagnetic bias layer 116 and the AFM bias layer 118 exchange couple to each other, resulting in dominant edge magnetostatic coupling field that stabilize the magnetization of the free layer 112. However, in the prior art in-stack bias scheme, the sense current will be shunted by the bias stack. In addition, the prior art in-stack bias scheme utilizes mainly the edge magnetostatic coupling field that requires self-aligned edges to produce a maximum edge magnetostatic coupling field that is opposite to the interlayer magnetostatic coupling field. It implies a requirement of minimizing the positive interlayer magnetostatic coupling field in order to maximize the longitudinal bias field.

U.S. Pat. No. 6,023,395 issued Feb. 8, 2000 to Dill et al. discloses a magnetic tunnel junction (MTJ) magnetoresistive (MR) read head with an in-stack biasing scheme. The MTJ head includes a MTJ stack, which contains a pinned layer, a free layer and an insulating tunnel barrier layer between the pinned layer and the free layer, a biasing ferromagnetic layer and a non-magnetic electrically conductive spacer layer separating the biasing ferromagnetic layer from the layers in the MTJ stack. The biasing ferromagnetic layer is magnetostatically coupled with the free layer to provide either longitudinal bias or transverse bias or a combination of longitudinal and transverse bias fields to the free layer. However, the in-stack biasing scheme of Dill is not optimal for a spin valve sensor read head since the read current and readback signal will be shunted by the biasing ferromagnetic layer.

There is a need, therefore, for an improved MR sensing head having a spin valve with a magnetically stabilized free layer and without significant shunting of the sense current by the longitudinal bias stack.

SUMMARY

A magnetoresistive (MR) sensing head according to a first embodiment of the present invention includes a current-in-plane CIP) sensor, an in-stack longitudinal bias structure, and an electrically insulating layer separating the CIP sensor and the in-stack longitudinal bias structure. The CIP sensor typically includes a ferromagnetic free layer, a ferromagnetic pinned layer, a spacer layer located between the ferromagnetic free layer and the ferromagnetic pinned layer, and an anti-ferromagnetic (AFM) layer adjacent to the ferromagnetic pinned layer for pinning the magnetic moment of the ferromagnetic pinned layer. The width along the off-track direction of the in-stack longitudinal bias structure is greater than the track-width of the CIP sensor such that the edge magnetostatic coupling field $H_D$ acting on the ferromagnetic free layer from the track-width edges of the longitudinal bias structure is reduced to approximately zero. Typically, the track-width of the CIP sensor is between 0.1 $\mu$m and 0.4 $\mu$m, and the width of the in-stack longitudinal bias structure is greater than 0.5 $\mu$m.

The in-stack longitudinal bias structure preferably includes a ferromagnetic bias layer adjacent to the electrically insulating layer and an AFM bias layer. The longitudinal stabilization is achieved by an interlayer magnetostatic coupling ($H_F$) acting on the free layer from the ferromagnetic bias layer across the electrically insulating layer.

In a preferred configuration of the first embodiment, the MR sensing head includes a CIP sensor with the ferromagnetic free layer on the top. The MR sensing head also includes abutted leads located on both sides of the CIP sensor. In this case, the electrically insulating layer includes a first insulating portion located on top of the CIP sensor and second insulating portions located on top of the abutted leads. The first insulating portion is thinner than the second insulating portion. Typically, the thickness of the first insulating portion is between 2 Å and 100 Å, and the thickness of the second insulating portion is between 30 Å and 600 Å. The MR sensing head further includes a bottom gap between a bottom shield and the AFM layer of the CIP sensor and a top gap located on top of the in-stack longitudinal bias structure. Since the second insulating portions are thick, these portions can serves as part of the top gap, therefore, the thickness of the top gap can be reduced significantly or eliminated. The thickness of the second gap is typically between zero and 300 Å.

Alternatively, the MR sensing head can include a CIP sensor with the ferromagnetic free layer on the bottom. The MR sensing head further includes abutted leads located on both sides of the CIP sensor. Alternatively, the MR sensing head can include overlaid leads.

In the present invention, the ferromagnetic free layer of the CIP sensor is electrically isolated from the longitudinal bias structure, and the leads that are attached to the CIP sensor do not make electrical contact to the longitudinal bias structure. As a result, the sense current shunting by the longitudinal bias structure is negligible.

In a second embodiment, the MR sensing head of the first embodiment is incorporated into a disk drive system. A disk drive system includes a magnetic recording disk connected to a motor and a MR sensing head connected to an actuator. The motor spins the magnetic recording disk with respect to the MR sensing head, and the actuator positions the MR sensing head relative to the magnetic recording disk.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
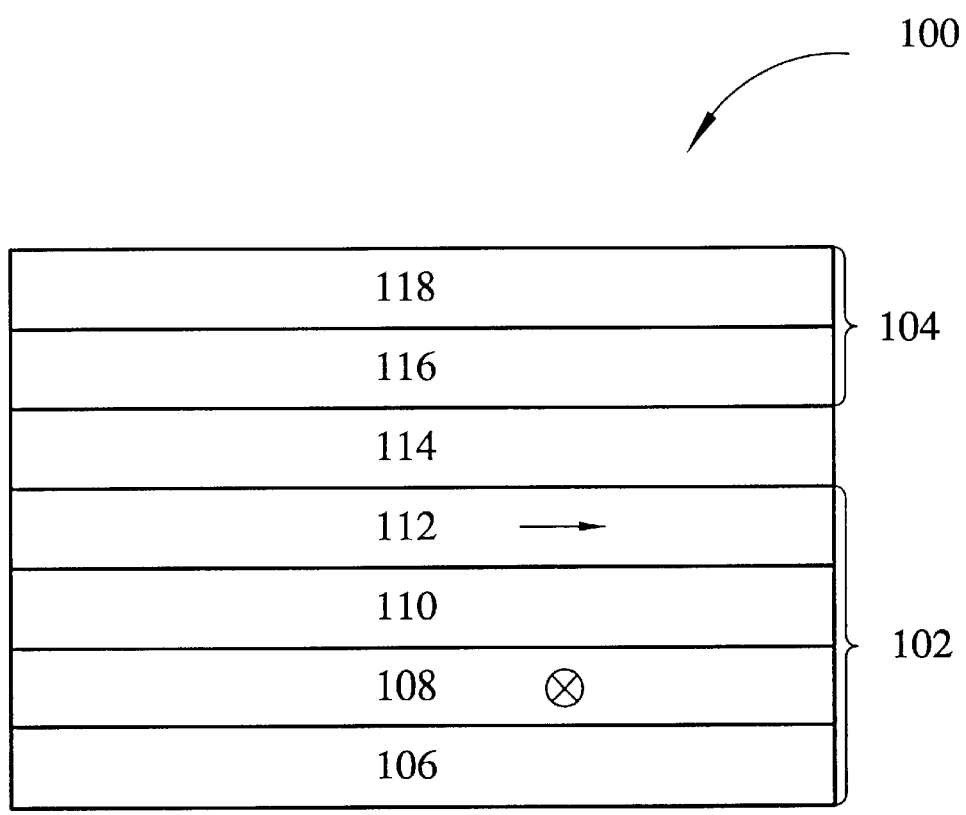
FIG. 1 is a cross-sectional schematic diagram of a CIP sensor with an in-stack longitudinal bias structure of the prior art.
Figure 2:
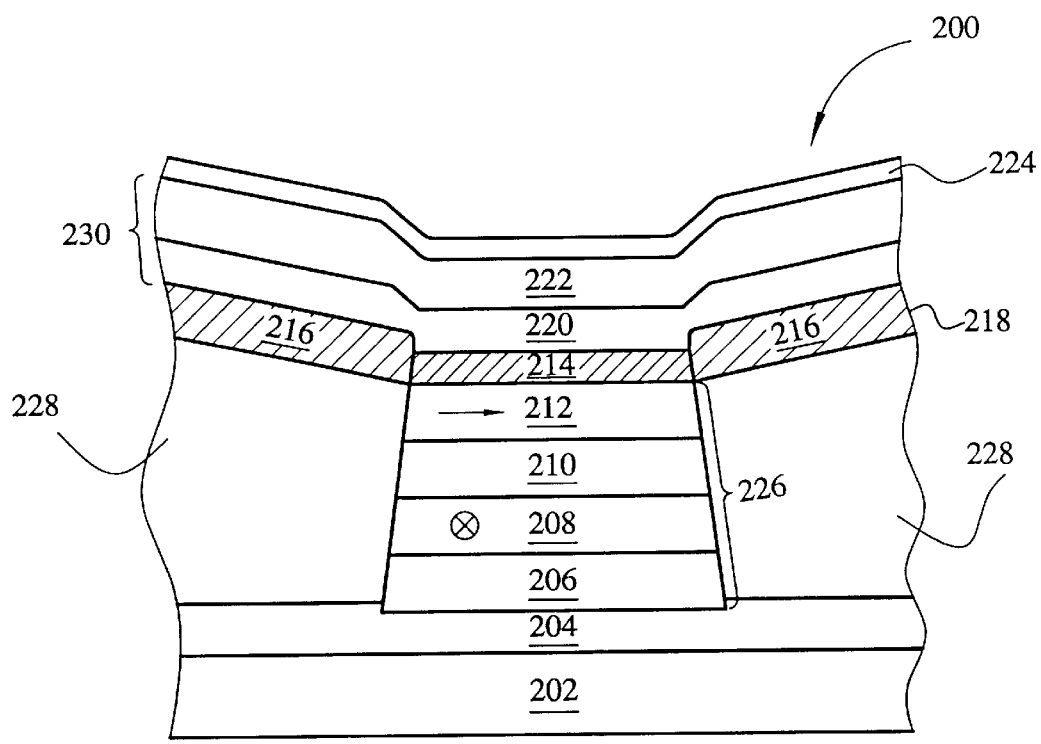
FIG. 2 is a cross-sectional schematic diagram of a MR sensing head having an in-stack longitudinal bias structure for stabilizing a CIP sensor with the ferromagnetic free layer on the top using an interlayer magnetostatic coupling $H_F$ according to a preferred configuration of the first embodiment of the present invention.

A preferred configuration of a first embodiment of the present invention is shown in FIG. 2, which is a cross-sectional schematic diagram of a MR sensing head 200. The MR sensing head 200 includes a CIP sensor 226 on the bottom, a longitudinal bias stack 230 on the top and an insulating layer 218 separating the CIP sensor 226 and the longitudinal bias stack 230. The CIP sensor 226 includes a ferromagnetic free layer 212 on the top, a ferromagnetic pinned layer 208, a spacer layer 210 between the ferromagnetic pinned layer 208 and the ferromagnetic free layer 212, and an anti-ferromagnetic (AFM) layer 206 adjacent to the ferromagnetic pinned layer 208. The longitudinal bias stack 230 includes a ferromagnetic bias layer 220 and an AFM bias layer 222. The MR sensing head 200 further includes two abutted leads 228 located on both sides of the CIP sensor 226, a bottom gap 204 between the AFM layer 206 and a bottom shield 202, and a top gap 224 located on top of the AFM bias layer 222 of the longitudinal bias stack 230.

The ferromagnetic free layer 212 is about 20 Å–50 Å thick and typically contains Ni, Fe, Co or their alloys. The ferromagnetic pinned layer 208 is about 10 Å–50 Å thick and typically contains Co or CoFe. The spacer layer 210 is 10 Å–30 Å thick and typically contains Cu and its alloys. The AFM layer 206 is about 50 Å–200 Å thick and typically contains an alloy consisting of Mn, such as NiMn, IrMn, PtMn, or FeMn. Two abutted leads 228 are typically made of conducting materials, such as Ta, Al, Au, W, Ru, Rh, Ti and Pt, with thicknesses between 20 Å and 400 Å. Bottom shield 202 is typically made of ferromagnetic material, such as NiFe, NiFeCo, FeN, and FeAlSi with a thickness of 0.5 μm–3 μm. The bottom and top gaps 204 and 224 are typically made of alumina. The thickness of the bottom gap 204 is between 20 Å and 300 Å.

The ferromagnetic bias layer 220 is about 20 Å–50 Å thick and typically contains Co or CoFe, and the AFM bias layer 222 is about 30 Å–200 Å thick and typically contains an alloy consisting of Mn, such as NiMn, IrMn, PtMn, or FeMn.

The insulating layer 218 is typically made of metal oxide, such as oxide of Al, Ta, Ni, or NiFe and contains a first insulating portion 214 on top of the CIP sensor 226 and second insulating portions 216 on top of the abutted leads 228. The insulating layer 218 electrically isolates the ferromagnetic free layer 212 from the longitudinal bias stack 230, and thus the leads 228 do not make direct electrical contact to the longitudinal bias stack 230. As a result, the effect of the current shunted by the longitudinal bias stack 230 is greatly reduced, thus the signal response for the CIP sensor 226 is enhanced. The first insulating portion 214 has an effective barrier resistance of greater than 200 $\Omega$-$\mu m^2$, so a good electrical isolation between the ferromagnetic free layer 212 and the ferromagnetic bias layer 220 can be achieved. In addition, for in-stack bias to work, i.e., for the interlayer magnetostatic coupling field from the ferromagnetic bias layer 220 to interact effectively with the ferromagnetic free layer 212, the separation between the ferromagnetic free layer 212 and the ferromagnetic bias layer 220 must be small. Typically, the thickness of the first insulating portion 214 is between 2 Å and 100 Å. The second insulating portions 216 are thicker than the first insulating portion 214. The thickness of the second insulating portions 216 is between 30 Å and 600 Å. Since the second insulating portions 216 are thick, these portions can serve as part of the top gap 224. Therefore, the thickness of the top gap 224 can be reduced significantly, which is inherent with a potential narrow gap capability. Typically, the thickness of the top gap is between zero and 300 Å.

It is known that achieving single domain stability for the ferromagnetic free layer 212 necessitates simultaneously achieving single domain stability in the ferromagnetic bias layer 220. This occurs through their mutual interaction, which includes both interlayer magnetostatic coupling and edge magnetostatic coupling. Since the interlayer magnetostatic coupling field $H_F$ is usually opposite to the edge magnetostatic coupling field $H_D$, one way to maximize the net longitudinal bias field $H_{bias}$ is to minimize the edge magnetostatic coupling field $H_D$. By making the edges of the ferromagnetic bias layer 220 far away from the edges of the ferromagnetic free layer 212, the edge magnetostatic coupling field $H_D$ will be reduced to approximately zero. As shown in FIG. 2, the width along the off-track direction of the ferromagnetic bias layer 220, or the width of the longitudinal bias stack 230, is greater than the width along the off-track direction of the ferromagnetic free layer 212, or the track-width of the CIP sensor 226. Typically, the track-width of the CIP sensor 226 is between 0.1 $\mu$m and 0.4 $\mu$m, and the width of the longitudinal bias stack 230 is greater than 0.5 $\mu$m.

The CIP sensor 226 of the MR sensing head 200 has the ferromagnetic free layer 212 on top of the sensor. It is known that the signal (e.g., $\Delta R/R$) of CIP sensors strongly depends on their underlayer properties, such as grain size and interfacial smoothness. Therefore, the signal response of the CIP sensors can be maximized by optimizing the underlayer properties.

Figure 3A:
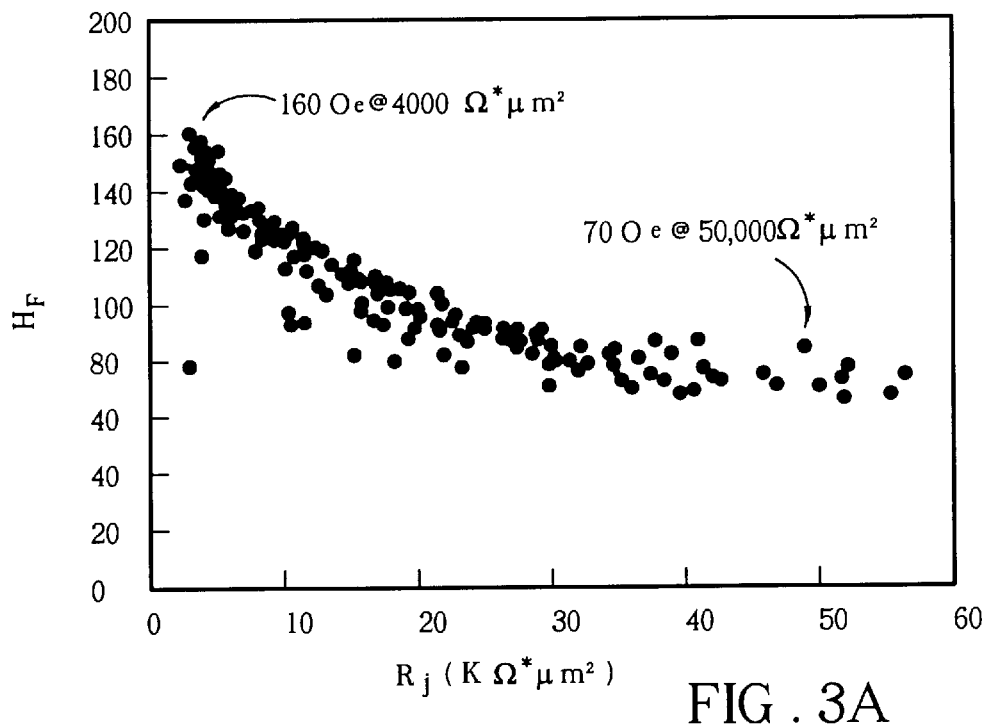
FIG. 3A is a graph illustrating the interlayer magnetostatic coupling $H_F$ as a function of the oxide barrier resistance $R_j$ of the MR sensing head depicted in FIG. 2.
Figure 3B:
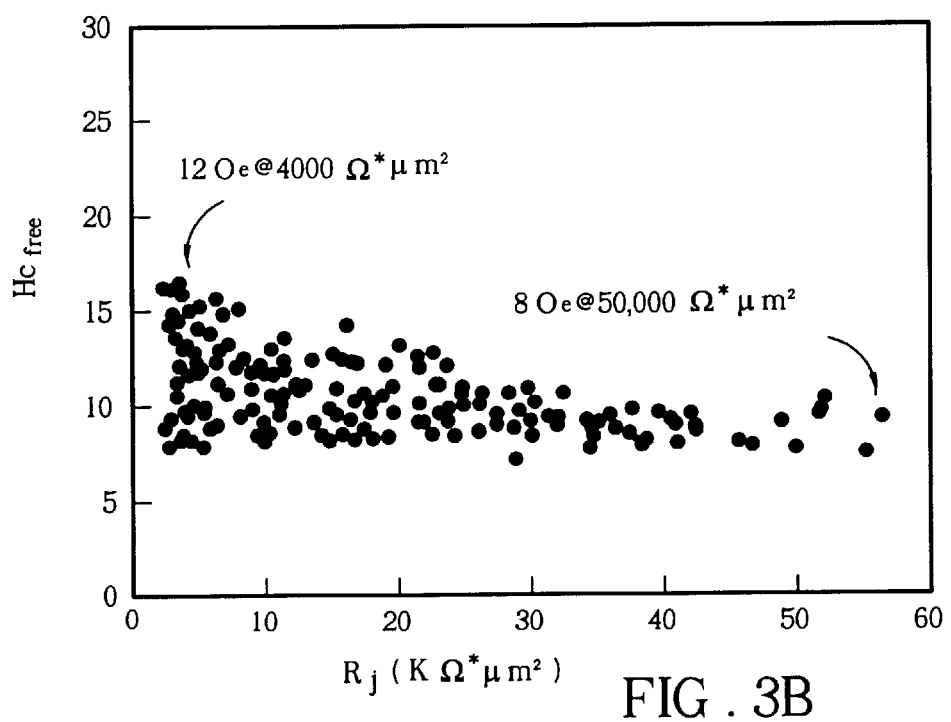
FIG. 3B is a graph illustrating the coercivity of the free layer $Hc_{free}$ as a function of the oxide barrier resistance $R_j$ of the MR sensing head depicted in FIG. 2.

FIG. 3A is a graph showing the interlayer magnetostatic coupling $H_F$ as a function of the resistance $R_j$, where $R_j$ is defined as a product of the resistance and the area of the first insulating portion 214. As shown in FIG. 3A, an interlayer magnetostatic coupling field $H_F$ of 160 Oe can be obtained with a large $R_j$ of 4000 $\Omega$-$\mu m^2$. As $R_j$ increases to 50 k$\Omega$-$\mu m^2$, a large $H_F$ of 70 Oe can still be achieved. It indicates that the first insulating portion 214 can be used to apply a substantial and controllable longitudinal bias to the ferromagnetic free layer 212 via $H_F$ while the amount of the current shunting by the longitudinal bias stack 230 is negligible because of its large $R_j$. Furthermore, the large increment of the $H_F$ does not necessarily degrade the soft magnetic properties of the ferromagnetic free layer 212. As shown in FIG. 3B, the measured coercivity $Hc_{free}$ of the ferromagnetic free layer 212 actually remains relatively small, only 12 Oe with 160 Oe of $H_F$.

Figure 4:
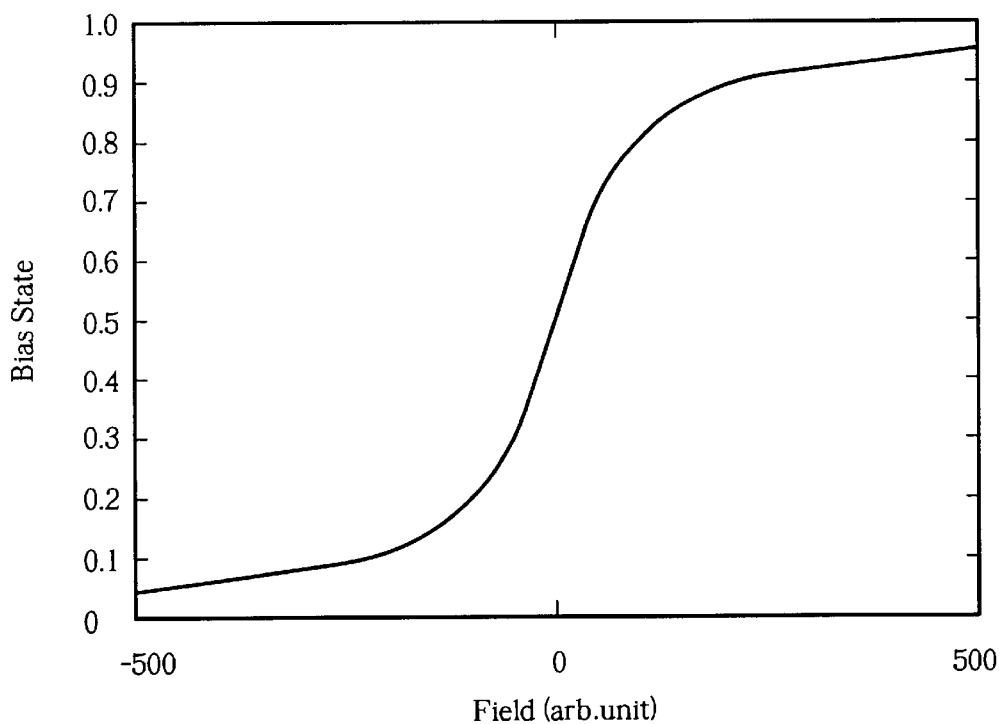
FIG. 4 is a graph showing a micromagnetic model of the MR sensing head depicted in FIG. 2 with a CIP sensor having 0.1 μm track-width and a total gap of 0.065 μm.

FIG. 4 is a graph showing a micromagnetic model for the CIP sensor 226 with 0.1 $\mu$m track-width and a total gap of 0.065 $\mu$m. The CIP sensor is stabilized by an interlayer magnetostatic coupling $H_F$ of 140 Oe. The micromagnetic model proves that a uni-directional force created by surface charges, such as $H_F$ and direct exchange coupling, can be used to stabilize the ferromagnetic free layer as long as the amount of the interlayer magnetostatic coupling field is sufficiently large.

Figure 5A:
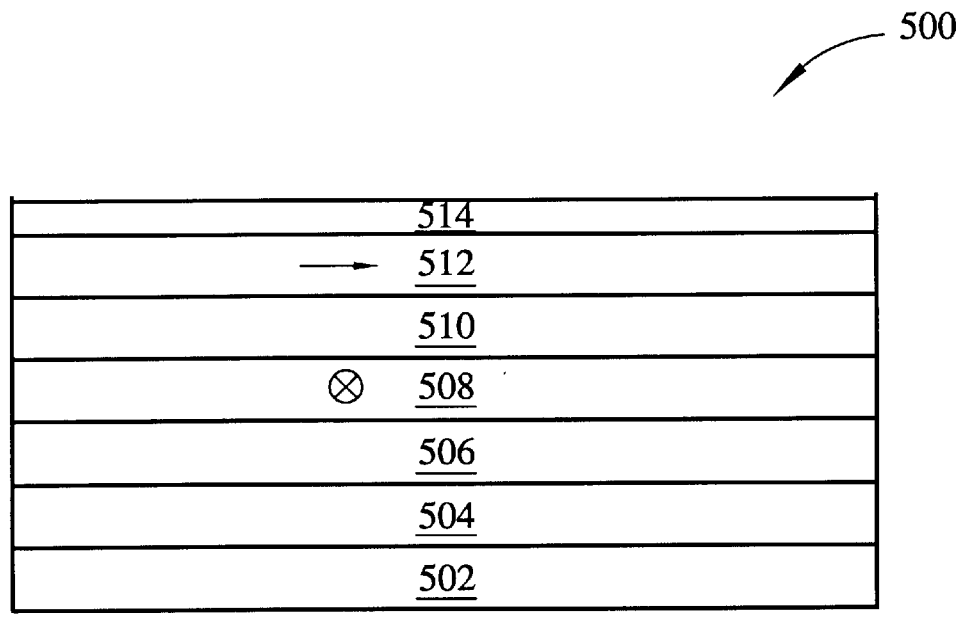
FIGS. 5A–5H depict the steps of a process for making the MR sensing head depicted in FIG. 2.

A series of the steps of a process for making the MR sensing head of the type depicted in FIG. 2 are shown in FIGS. 5A–5H. As shown in FIG. 5A, a CIP sensor stack 500 is first deposited. The CIP sensor stack 500 includes a ferromagnetic free layer 512 on the top, a ferromagnetic pinned layer 508, a metal spacer layer 510 between the ferromagnetic free layer 512 and the ferromagnetic pinned layer 508, and an anti-ferromagnetic (AFM) layer 506 adjacent to the ferromagnetic pinned layer 508. The CIP sensor stack 500 further includes a protecting layer or cap 514 adjacent to the ferromagnetic free layer 512, a bottom gap 504 between the AFM layer 506 and a bottom shield 502. All layers of the CIP sensor stack 500 are preferably deposited by typical vacuum deposition techniques, such as ion beam deposition, RF or DC magnetron sputtering deposition, evaporation deposition, or MBE deposition.

Figure 5B:
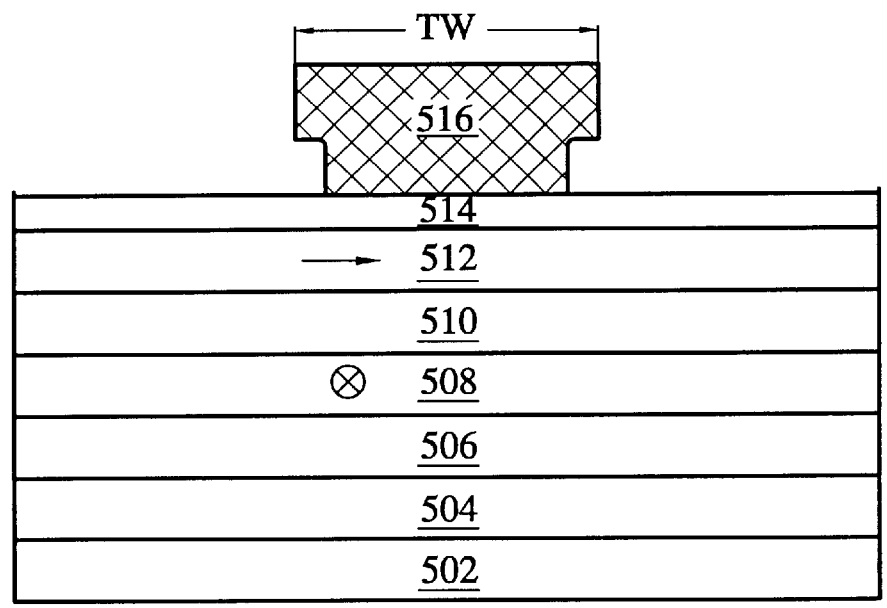
Figure 5C:
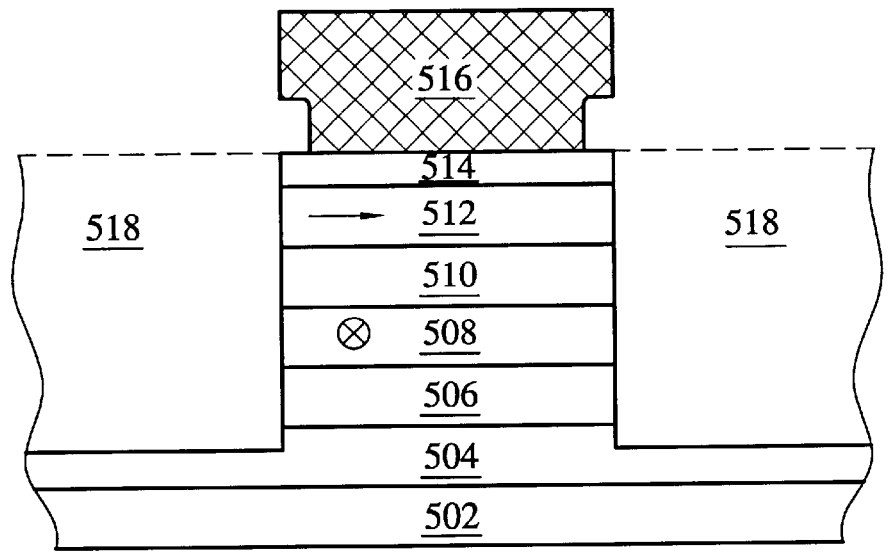
Figure 5D:
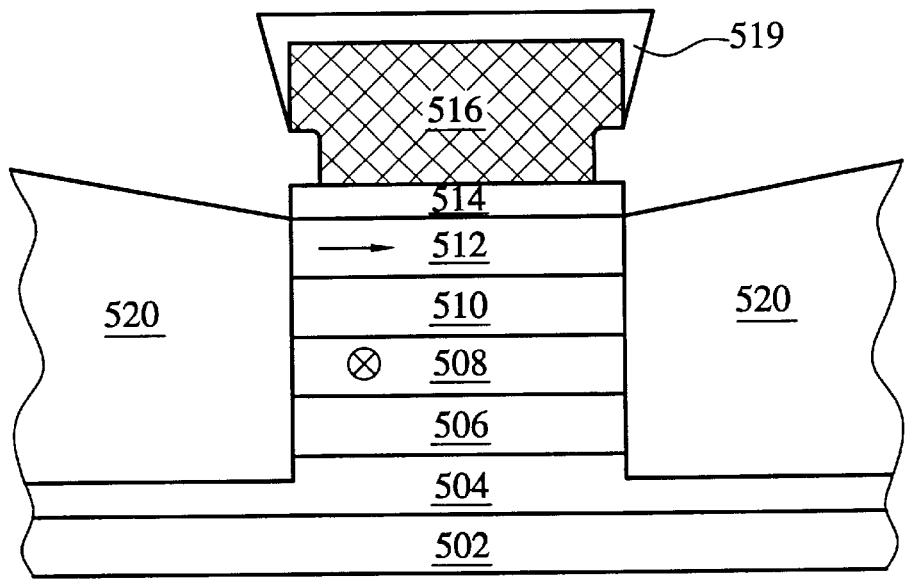

The CIP sensor stack 500 is then patterned using a photoresist mask 516 to define a track-width of the CIP sensor 501 as shown in FIG. 5B. The materials in the unmasked regions 518 of the CIP sensor stack 500 are removed using subtractive techniques, such as ion beam milling, chemically-assisted ion beam milling, sputter etching, or reactive ion etching with the endpoint terminating within the bottom gap 504 as shown in FIG. 5C. The unmasked regions 518 are then deposited with leads 520, which preferably have shallow angle, as shown in FIG. 5D. The deposition of leads can be done using typical vacuum deposition techniques as described above. As shown in FIG. 5D, a quantity of leads 519 is also deposited onto the top and sidewalls of the photoresist mask 516.

Figure 5E:
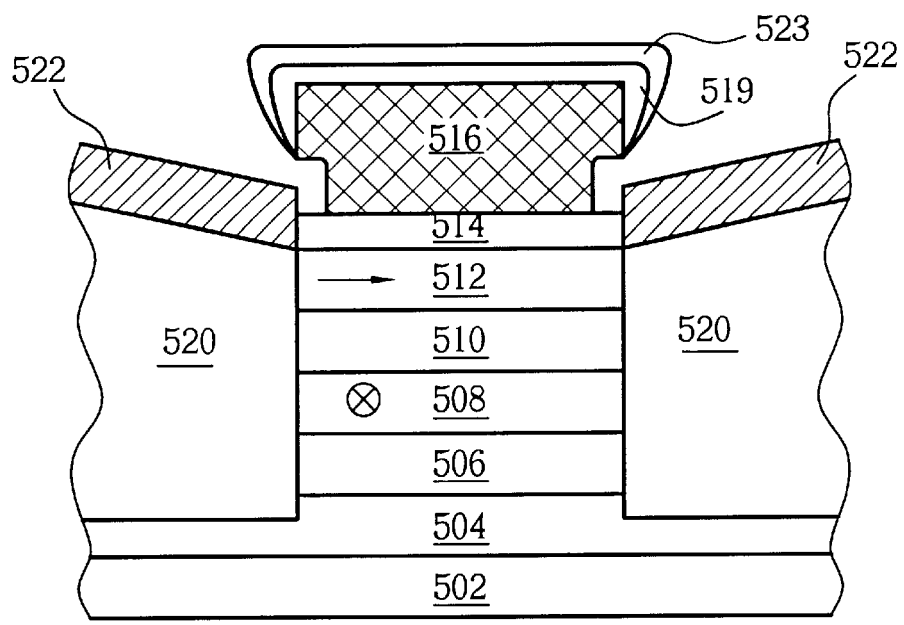

As shown in FIG. 5E, thick oxide layers 522, such as alumina, are deposited on top of leads 520, and a quantity of oxide 523 is also deposited onto the top of the leads 519. However, the quantities of leads 519 and oxide 523 are removed along with the photoresist mask 516 in a subsequent lift-off process. Alternatively, the thick oxide layers can be formed by heavily oxidizing upper portions of the leads 520. In this case, the upper portions of leads 520 preferably contain metals that can be easily oxidized, such as Al, Ta, Ni and NiFe, and thus, the leads 520 may contain a bilayer or a trilayer of metals, such as Ta/Au/Ta or Ta/Au/Al.

Figure 5F:
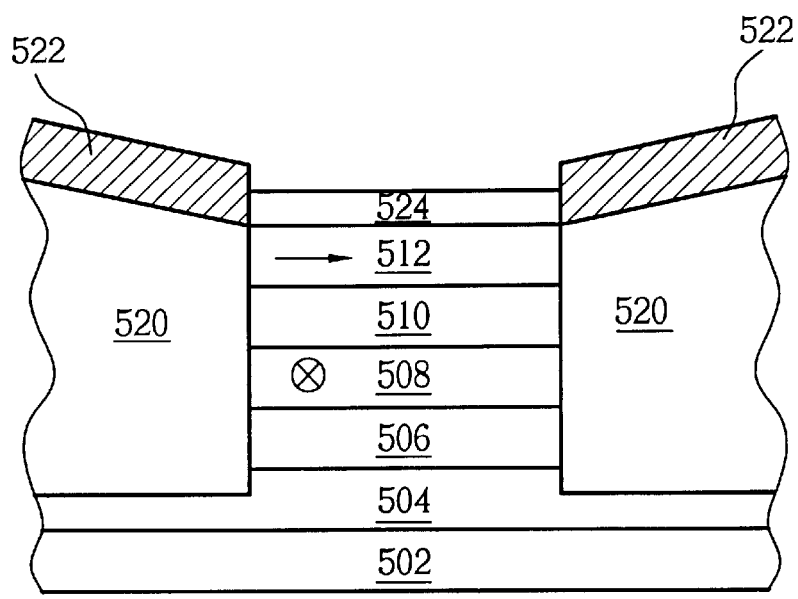
Figure 5G:
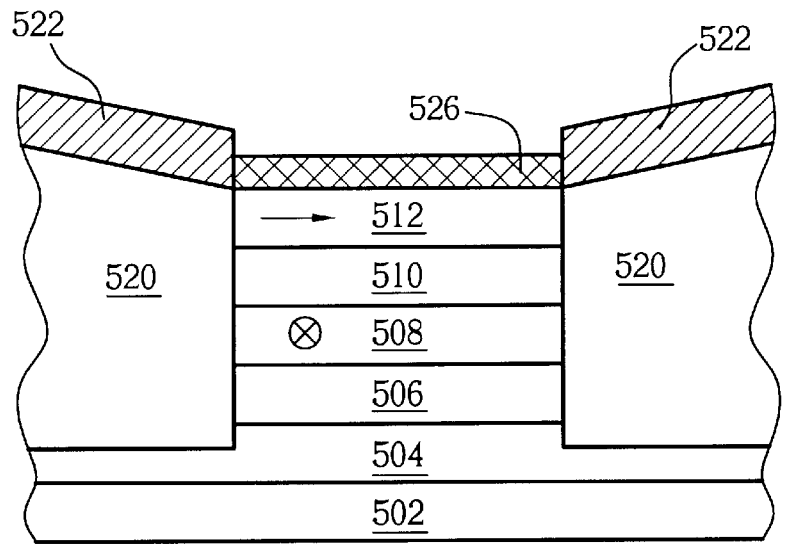

As shown in FIG. 5F, the photoresist mask 516 is removed in a lift-off process. The cap 514 is then removed using subtractive techniques, followed by re-deposition of a thin layer 524 of metals that can be easily oxidized, such as Al and Ta, on top of the ferromagnetic free layer 512. Alternatively, the thin layer 524 can be formed by direct deposition of metal oxides. The thin metal layer 524 is then oxidized by plasma, thermal or air oxidation to form a highly resistive oxide barrier layer 526 on top of the CIP sensor 500 as shown in FIG. 5G. Alternatively, the cap layer 514 is not removed from the CIP sensor stack, and the highly resistive oxide barrier layer 526 is formed by oxidizing the cap layer 514.

Figure 5H:
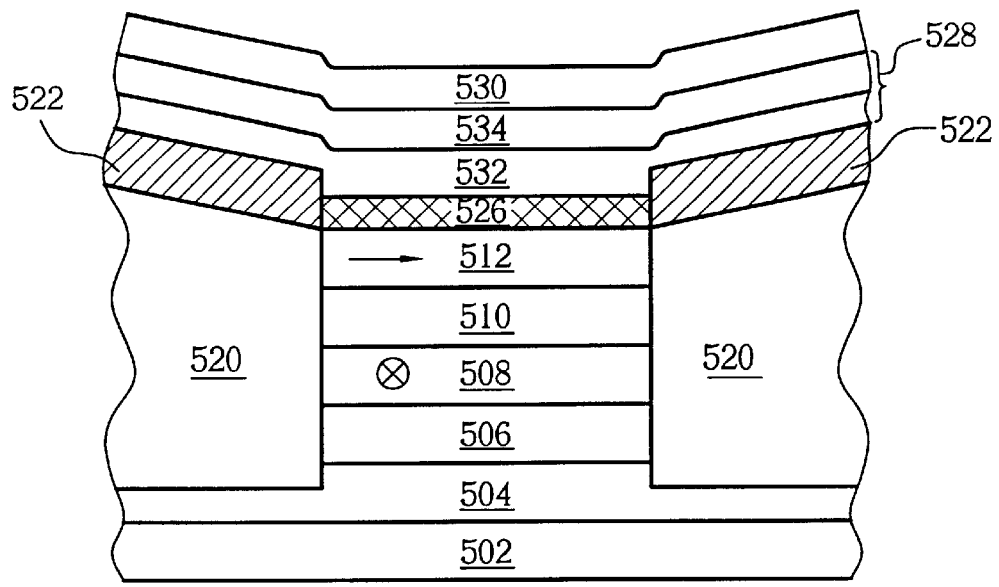
Figure 5:
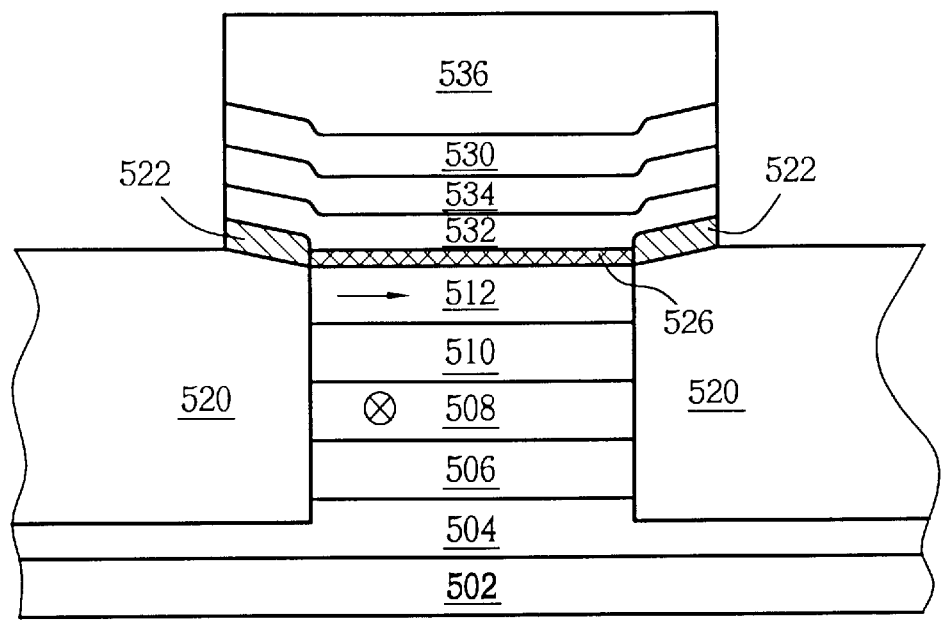
FIGS. 5I–5L depict the steps of a process for patterning the CIP sensor's stripe height and the stitch leads of the MR sensing head formed in FIG. 5H.

As shown in FIG. 5H, a longitudinal bias stack 528 is deposited on the thick oxide layer 522 and thin oxide layer 526, and a top gap 530 of insulating materials is deposited on the longitudinal bias stack 528. The top gap 530 can be extremely thin since the thick oxide layers 522 can serve as part of the top gap 530. The longitudinal bias stack 528 includes a ferromagnetic bias layer 532 and an AFM bias layer 534.

Figure 5J:
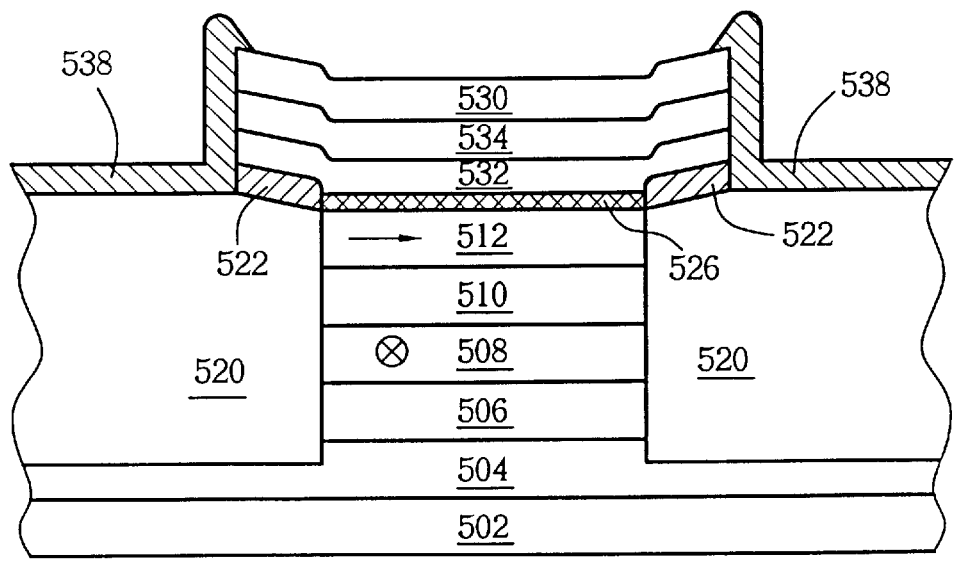
Figure 5K:
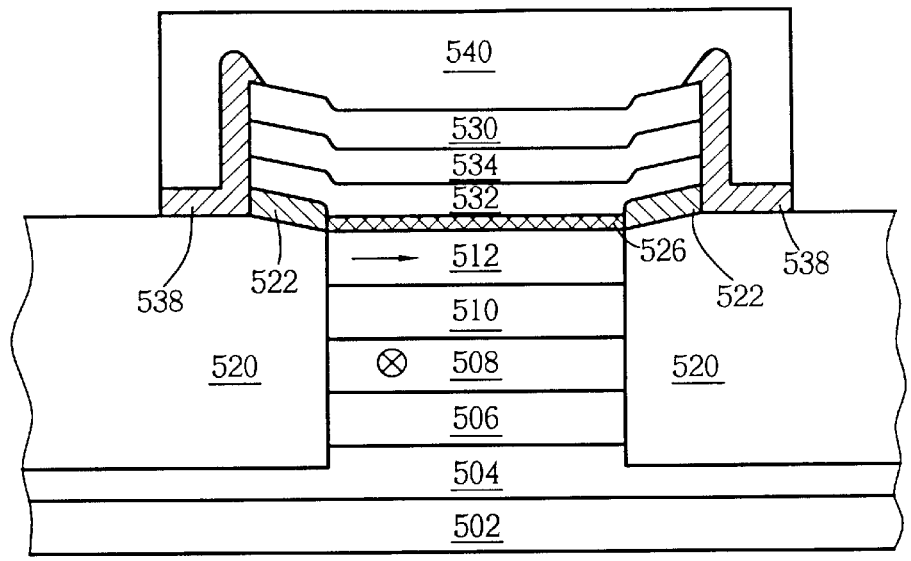
Figure 5L:
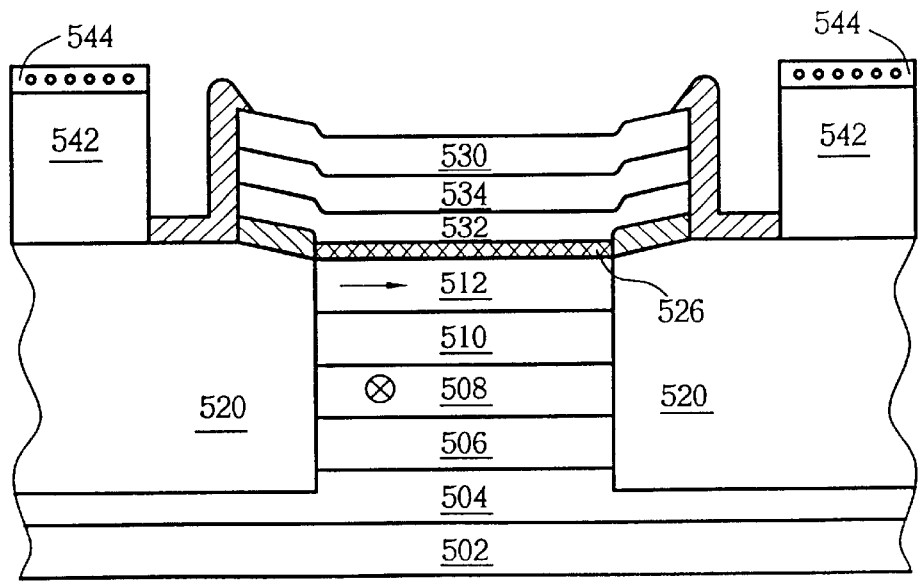

FIGS. 5I–5L show the steps of a process for patterning the stripe height and the stitch leads of the MR sensing head formed in the step of FIG. 5H. The stripe height of the MR sensing head is first defined (not shown). The stitch leads are then defined using a photoresist mask 536, and materials in the unmasked regions are removed using subtractive techniques with the endpoint going through the thick oxide layer 522 as shown in FIG. 5I. Thin insulation layers 538, such as alumina, are deposited on the leads 520, and the photoresist mask 536 is removed as shown in FIG. 5J. Another photoresist mask 540 is deposited on top of the MR sensing head and the insulation layers 538, and the material of the insulation layers 538 in the unmasked regions are removed using subtractive techniques as shown in FIG. 5K. Stitch leads 542 and insulation layers 544 are then deposited followed by the lift-off of the photoresist mask 540 as shown in FIG. 5L.

Figure 6A:
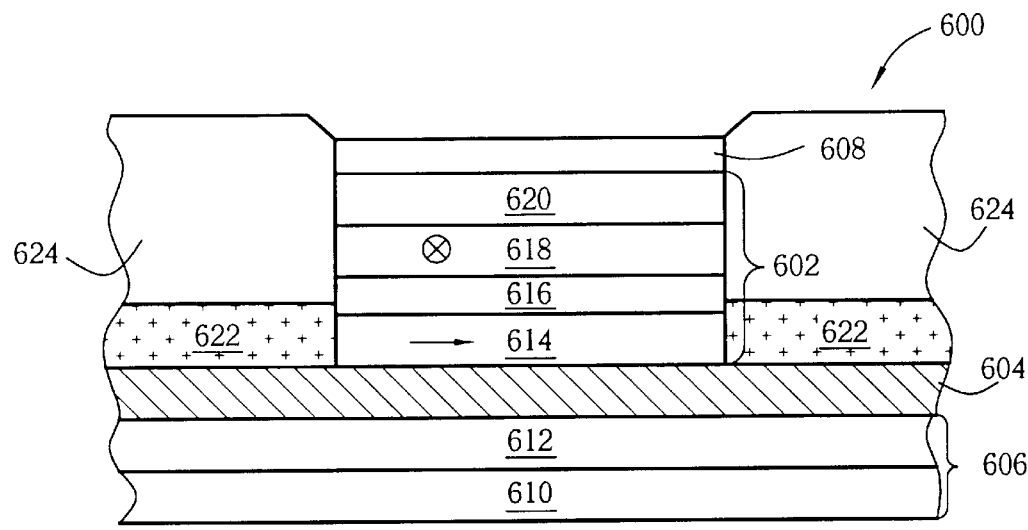
FIG. 6A is cross-sectional schematic diagram of a MR sensing head having an insulating longitudinal bias stack for stabilizing a CIP sensor with the ferromagnetic free layer on the bottom and abutted leads using interlayer magnetostatic coupling $H_F$ according to an alternative configuration of the first embodiment.

An alternative configuration of the first embodiment is shown in FIG. 6A, which is a cross-sectional schematic diagram of a MR sensing head 600. As shown in FIG. 6A, MR sensing head 600 includes a CIP sensor 602 on the top, a longitudinal bias stack 606 on the bottom and an insulating layer 604 separating the CIP sensor 602 and the longitudinal bias stack 606. The CIP sensor 602 includes a ferromagnetic free layer 614 at the bottom, a ferromagnetic pinned layer 618, a nonmagnetic spacer layer 616 between the ferromagnetic free layer 614 and the ferromagnetic pinned layer 618, and an AFM layer 620 adjacent to the ferromagnetic pinned layer 618. The longitudinal bias stack 606 includes a ferromagnetic bias layer 612 and an AFM bias layer 610. The MR sensing head further includes a protecting layer or cap 708 on top of the CIP sensor 602, and oxide layers 622 and abutted leads 624 disposed on both sides of the CIP sensor 602. The materials and thicknesses of layers of the MR sensing head 600 are similar to those of the MR sensing head 200 as described above.

Figure 6B:
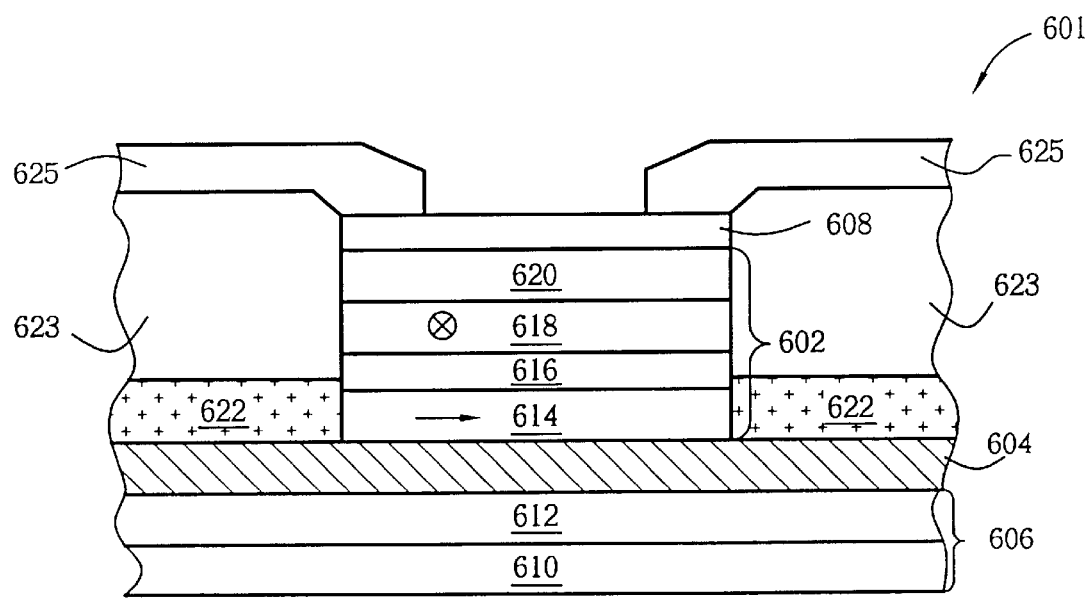
FIG. 6B is cross-sectional schematic diagram of a MR sensing head having an insulating longitudinal bias stack for stabilizing a CIP sensor with the ferromagnetic free layer on the bottom and overlaid leads using interlayer magnetostatic coupling $H_F$ according to an alternative configuration of the first embodiment.

Alternatively, a MR sensing head can include overlaid leads as shown in FIG. 6B. MR sensing head 601 includes a CIP senor 602, a longitudinal bias stack 606, an insulating layer 604, cap 608 and oxide layers 622 similar to those of the MR sensing head 600. MR sensing head 601 further includes insulating layers 623 disposed on both sides of the CIP sensor 602 and overlaid leads 625 located on top of the insulating layers 623.

Figure 7A:
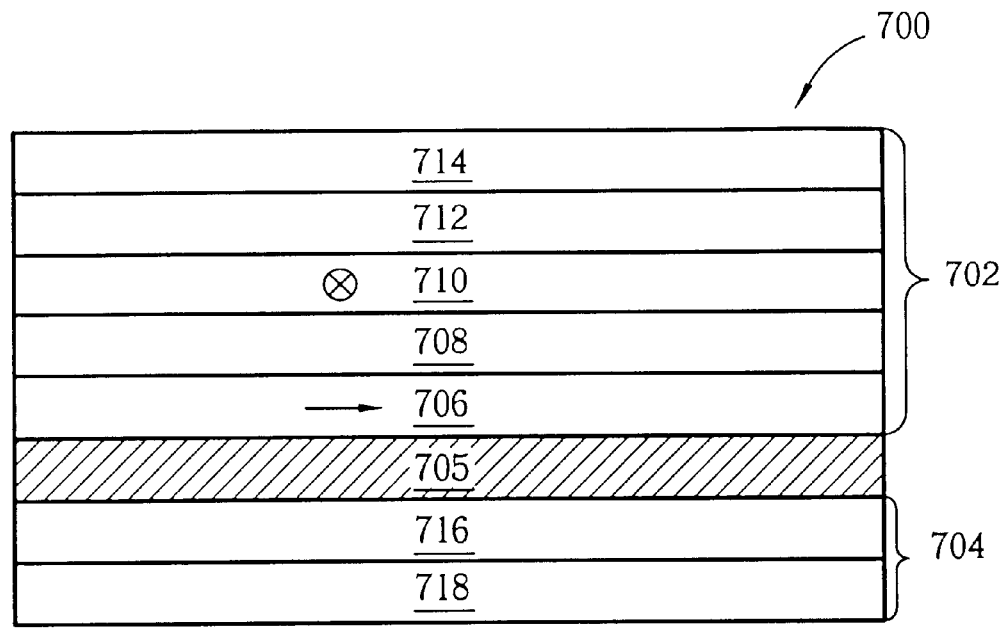
FIGS. 7A–7E depict the steps of a process for making the MR sensing head depicted in FIG. 6A.

A process of making the MR sensing head of the type depicted in FIG. 6A is shown in FIGS. 7A–7E. As shown in FIG. 7A, a layered structure 700, which includes CIP sensor stack 702 on top of a longitudinal bias stack 704 and an insulating barrier layer 705 separating the CIP sensor stack 702 and the longitudinal bias stack 704, is first deposited. The CIP sensor stack 702 includes a ferromagnetic free layer 706 on the bottom, a ferromagnetic pinned layer 710, a non-magnetic spacer layer 708 between the ferromagnetic free layer 706 and the ferromagnetic pinned layer 710, and an AFM layer 712 adjacent to the ferromagnetic pinned layer 710. The CIP sensor stack 702 also includes a cap 714 on top of the AFM layer 712. The longitudinal bias stack 704 includes a ferromagnetic bias layer 716 on top of an AFM bias layer 718. All layers of the layered structure 700 are preferably deposited by typical vacuum deposition techniques as described above. The insulating barrier layer 705 can be formed by the deposition of a metal layer, such as Al, Ta, Ni or NiFe, and following by plasma, thermal or air oxidation to form a highly resistive barrier layer between the ferromagnetic bias layer 716 and the ferromagnetic free layer 706.

Figure 7B:
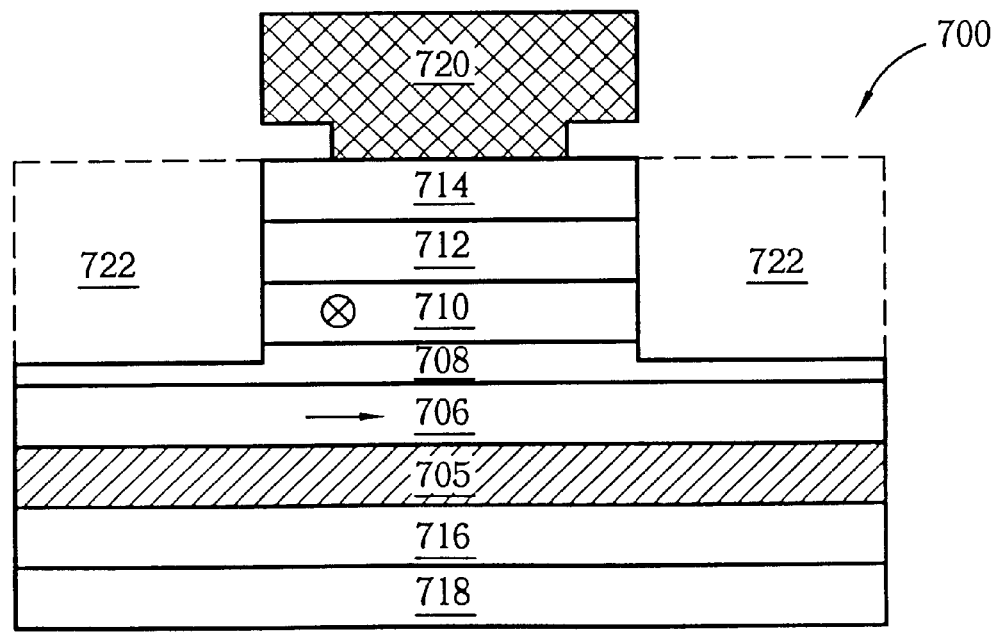
Figure 7C:
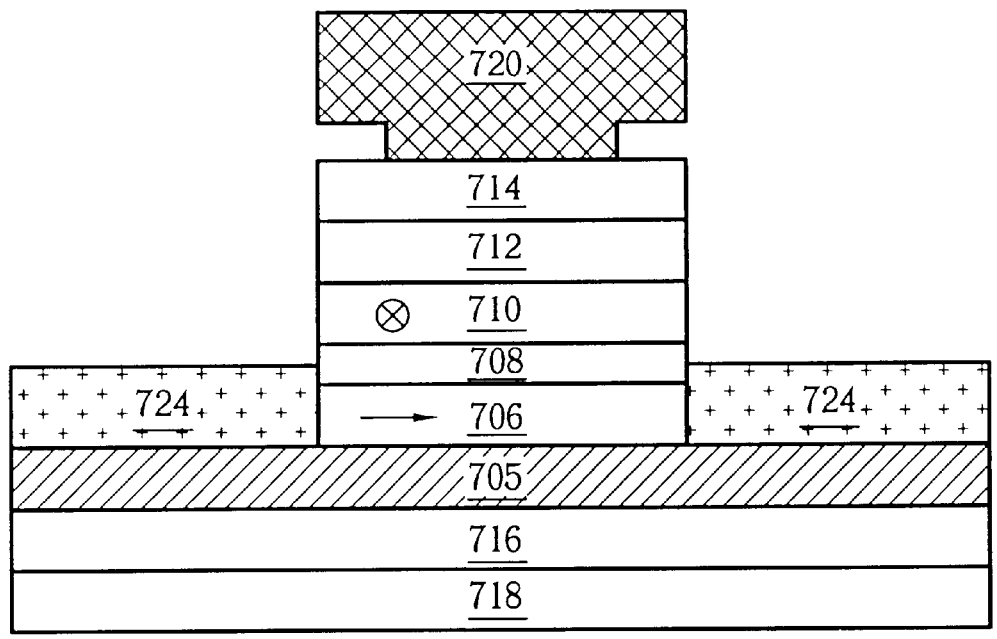

The CIP sensor stack 702 is then patterned using a photoresist mask 720 to define a track-width of the CIP sensor as shown in FIG. 7B. The materials in the unmasked regions 722 of the CIP sensor stack 702 are removed using subtractive techniques with the endpoint terminating within the spacer layer 708 or the ferromagnetic pinned layer 710. As shown in FIG. 7B, the endpoint terminates within the spacer layer 708. The material in the remaining portions 724 of the spacer layer 708 and portions of the ferromagnetic free layer 706 in the unmasked regions is controllably oxidized as shown in FIG. 7C. Oxidation is required because it would be virtually impossible to do an ion milling that stops in the insulating barrier layer 705.

Figure 7D:
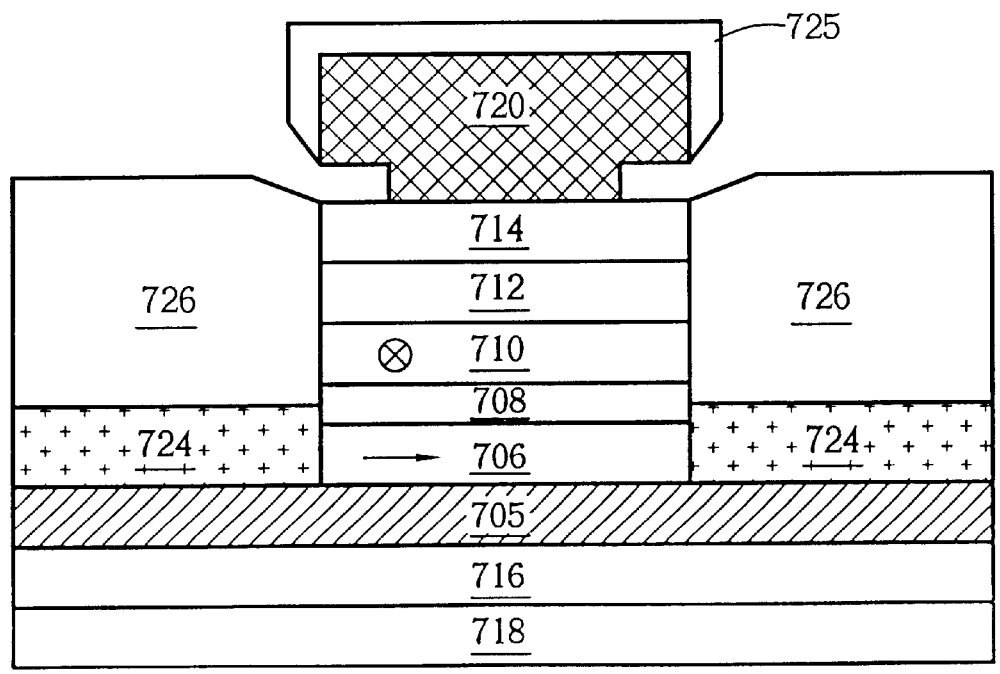
Figure 7E:
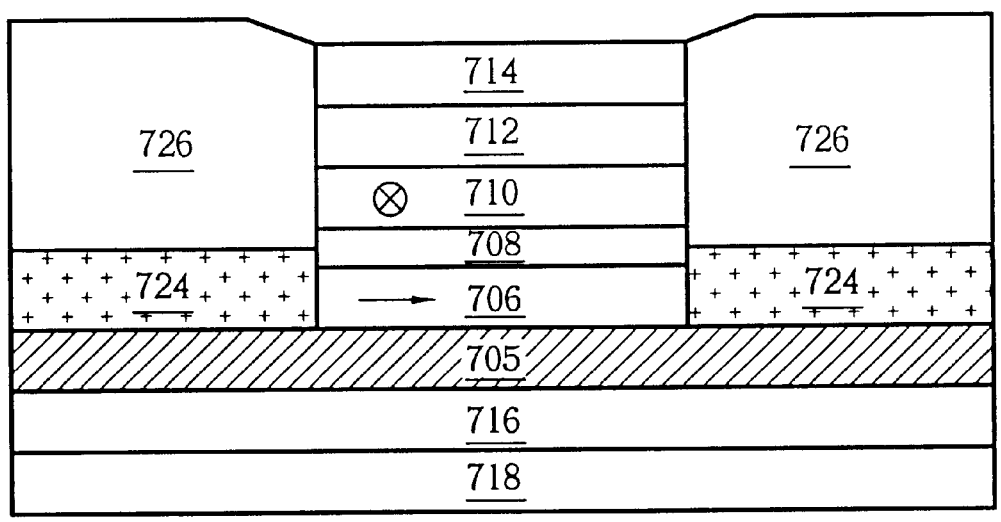

Leads 726 are then deposited in the unmasked regions 722 as shown in FIG. 7D. The deposition of leads 726 can be done using typical vacuum deposition techniques. As shown in FIG. 7D, a quantity of leads 725 is also deposited onto the top and sidewalls of the photoresist mask 720. However, this quantity of leads is removed along with the photoresist mask 720 in a lift-off process as shown in FIG. 7E. If lead overlay designs, as shown in FIG. 6B, are used, the insulating layers, such as alumina, are deposited in the unmasked regions after the oxidation followed by a second lithography step to form the leads. An advantage of this method is that the formation of the MR sensing head is achieved with an in-situ deposition of the layers of the CIP sensor and the longitudinal bias structure.

Figure 8:
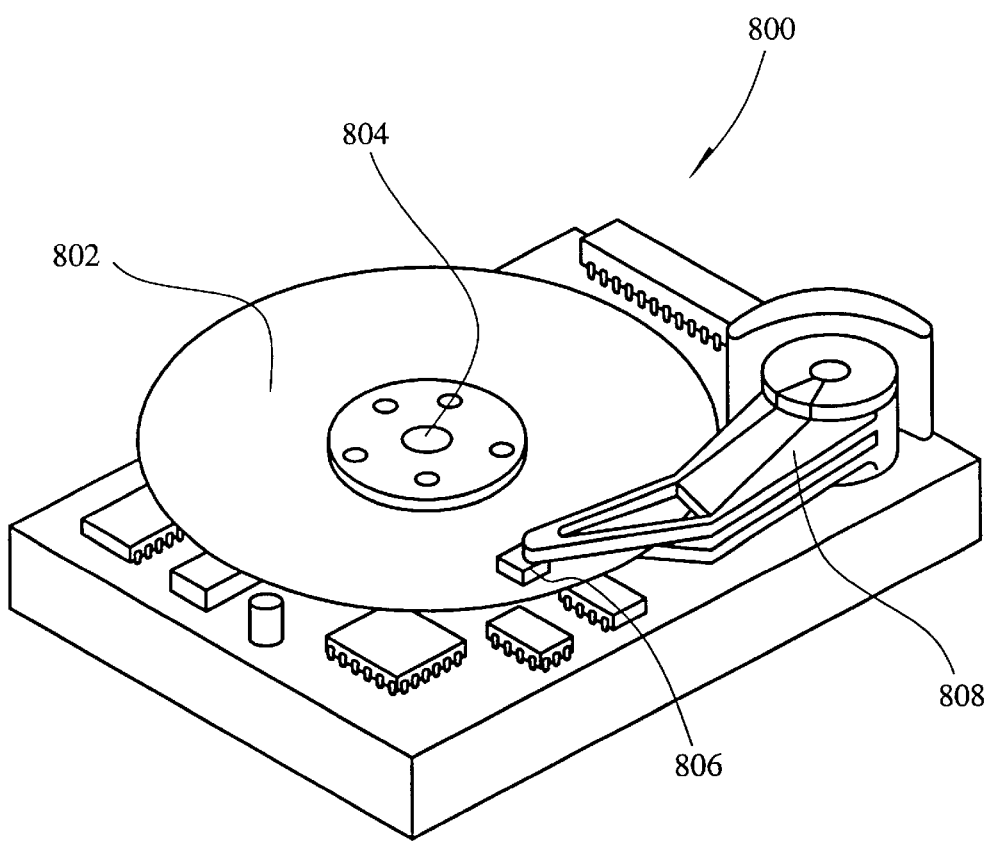
FIG. 8 is an isometric view of a disk drive including a MR sensing head of the type depicted in FIGS. 2 and 6A–6B according to a second embodiment of the present invention.

In a second embodiment of the present invention, the MR sensing heads of the types depicted in FIGS. 2 and 6A–6B are incorporated in the disk drive systems 800 as shown in FIG. 8. Disk drive 800 includes a magnetic recording disk 802 connected to a motor 804 and MR sensing head 806 connected to an actuator 808. The motor 804 spins the magnetic recording disk 802 with respect to the MR sensing head 806. The actuator 808 moves the MR sensing head 806 across the magnetic recording disk 802 so the MR sensing head 806 may access different regions of magnetically recorded data on the magnetic recording disk 802.

It will be clear to one skilled in the art that the above embodiment may be altered in many ways without departing from the scope of the invention. Accordingly, the scope of the invention should be determined by the following claims and their legal equivalents.

What is claimed is:

1. A magnetoresistive sensing head comprising:
   a) a current-in-plane (CIP) sensor including a ferromagnetic free layer;
   b) an in-stack longitudinal bias structure for stabilizing the magnetic moment of the ferromagnetic free layer; and
   c) an electrically insulating layer separating the ferromagnetic free layer and the longitudinal bias structure;
   wherein a width along the off-track direction of the in-stack longitudinal bias structure is greater than a width along the off-track direction of the ferromagnetic free layer such that the edge magnetostatic coupling field $H_D$ acting on the ferromagnetic free layer from the track width edge of the in-stack longitudinal bias structure is reduced to approximately zero.

2. The magnetoresistive sensing head of claim 1, wherein the in-stack longitudinal bias structure comprises a ferromagnetic bias layer.

3. The magnetoresistive sensing head of claim 2, wherein the in-stack longitudinal bias structure further comprises an anti-ferromagnetic bias layer for pinning the magnetization of the ferromagnetic bias layer.

4. The magnetoresistive sensing head of claim 1, wherein the CIP sensor has the ferromagnetic free layer on the top.

5. The magnetoresistive sensing head of claim 4 further comprising abutted leads located on both sides of the CIP sensor.

6. The magnetoresistive sensing head of claim 5, wherein the electrically insulating layer comprises a first insulating portion on top of the CIP sensor and second insulating portions on top of the abutted leads, wherein the first portion is thinner than the second portions.

7. The magnetoresistive sensing head of claim 6, wherein a thickness of the first insulating portion is between 2 Å and 100 Å.

8. The magnetoresistive sensing head of claim 6, wherein a thickness of each second insulating portion is between 30 Å and 600 Å.

9. The magnetoresistive sensing head of claim 6 further comprising a first gap between an anti-ferromagnetic layer of the CIP sensor and a shield.

10. The magnetoresistive sensing head of claim 6 further comprising a second gap located on top of the in-stack longitudinal bias structure.

11. The magnetoresistive sensing head of claim 10, wherein a thickness of the second gap is between zero and 300 Å.

12. The magnetoresistive sensing head of claim 1, wherein the CIP sensor has the ferromagnetic free layer on the bottom.

13. The magnetoresistive read head of claim 12 further comprising abutted leads.

14. The magnetoresistive sensing head of claim 12 further comprising overlaid leads.

15. The magnetoresistive sensing head of claim 1, wherein the width along the off track direction of the ferromagnetic free layer is between 0.1 micron and 0.4 micron, and the width along the off track direction of the in-stack longitudinal bias structure is at least 0.5 micron.

16. A disk drive system comprising:
   a) a magnetic recording disk;
   b) a magnetoresistive sensing head supported on a slider for magnetically reading data from the magnetic recording disk;
   c) an actuator connected to the slider for moving the magnetoresistive sensing head across the magnetic recording disk; and
   d) a mechanism for moving the magnetic recording disk relative to the magnetoresistive sensing head;
wherein the magnetoresistive sensing head comprising:
   i) a current-in-plane (CIP) sensor including a ferromagnetic free layer;
   ii) an in-stack longitudinal bias structure for stabilizing the magnetic moment of the ferromagnetic free layer; and
   iii) an electrically insulating layer separating the ferromagnetic free layer and the in-stack longitudinal bias structure;
wherein a width along the off track direction of the in-stack longitudinal bias structure is greater than a width along the off track direction of the ferromagnetic free layer such that the edge magnetostatic coupling field $H_D$ acting on the ferromagnetic free layer from the track width edges of the in-stack longitudinal bias structure is reduced to approximately zero.

17. The disk drive system of claim 16, wherein the CIP sensor has the ferromagnetic free layer on the top.

18. The disk drive system of claim 16, wherein the CIP sensor has the ferromagnetic free layer on the bottom.

* * * * *